Figure 1:
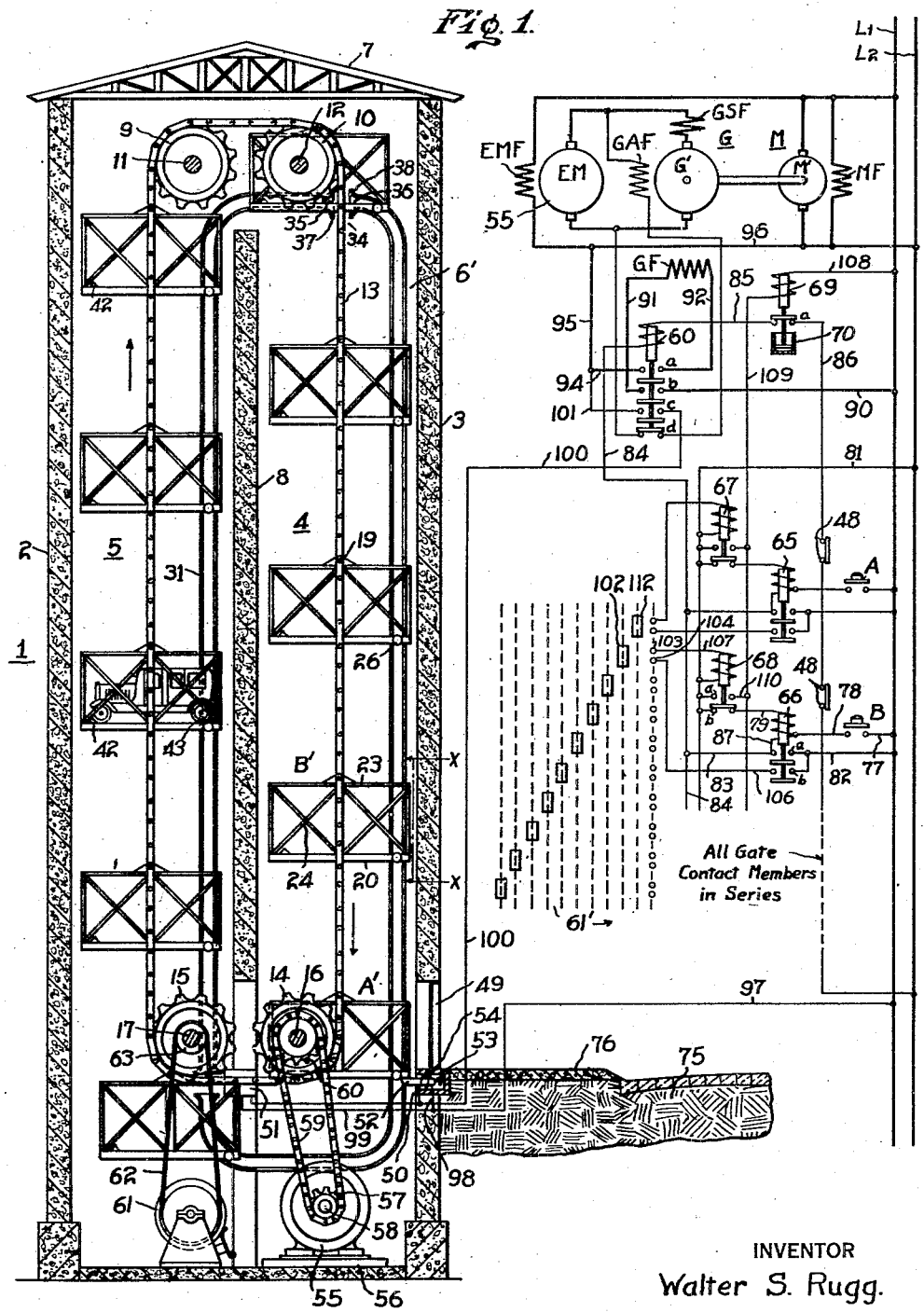

Aug. 2, 1932. W. S. RUGG 1,870,069
AUTO PARKING AND STORAGE SYSTEM
Filed July 15, 1927 2 Sheets-Sheet 1

INVENTOR
Walter S. Rugg.
BY
ATTORNEY

Aug. 2, 1932.    W. S. RUGG    1,870,069
AUTO PARKING AND STORAGE SYSTEM
Filed July 15, 1927    2 Sheets-Sheet 2
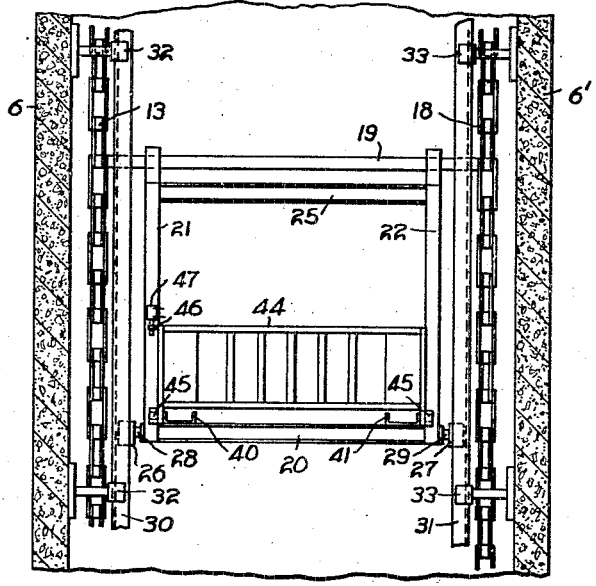
INVENTOR
Walter S. Rugg.
BY
ATTORNEY Patented Aug. 2, 1932

1,870,069

UNITED STATES PATENT OFFICE

WALTER S. RUGG, OF PITTSBURGH, PENNSYLVANIA, ASSIGNOR TO WESTINGHOUSE ELECTRIC & MANUFACTURING COMPANY, A CORPORATION OF PENNSYLVANIA

AUTO-PARKING AND STORAGE SYSTEM

Application filed July 15, 1927. Serial No. 205,875.

My invention relates to storage systems and has particular relation to the storage or parking of automobiles and similar vehicles.

An object of my invention is to provide a system for parking and storing vehicles to accommodate the greatest possible number of vehicles on the least possible ground area.

Another object of my invention is to provide a parking or storage system for vehicles wherein the vehicles may be stored and taken from storage without congestion and in the least possible time.

Another object of my invention is to provide a parking or storage system for vehicles wherein each vehicle is readily accessible at all times, regardless of the time at which it was stored with reference to other stored vehicles and regardless of its position in storage relative to that of other vehicles.

Another object of my invention is to provide a parking system for automobiles of the type wherein the vehicles are stored on platforms carried by endless chains and wherein any selected car may be automatically brought to the entrance of the storage building without disturbing the remaining vehicles in storage.

Another object of my invention is to provide a control system for a storage or parking device of the endless-chain-of-platforms type wherein a motor is used to move the platforms to and from the entrance or loading point and wherein the motor is automatically controlled to bring any selected platform to the entrance point.

Another object of my invention is to provide a system of the type described in the preceding paragraph wherein a control means for each of the platforms in the system may be actuated to cause the corresponding platform to be brought to the loading point and wherein any number of the control means may be actuated in any order and the platforms will be successively brought to the loading point in the natural order of their approach to the loading point.

Another object of my invention is to provide a control system for a plurality of independent storage systems of the type described in the preceding paragraph wherein all of the control means for all of the systems may be located at a centralized point.

My invention is described with reference to the accompanying drawings, wherein

Figure 1 is a schematic view of my storage system, with the control and operated mechanism diagrammatically illustrated, Fig. 2 is a broken sectional view through my device taken on the line X—X in Fig. 1, Fig. 3 is a schematic view, partly in section, of a modified form of my storage system, and Fig. 4 is a schematic view showing the arrangement of a plurality of storage devices and showing the centralized location of the control means for all of the devices.

Referring to Fig. 1, a suitable housing structure 1 is shown as comprising side walls 2 and 3 and as enclosing a pair of open shafts or hatchways 4 and 5. The structure is designed to be completely enclosed by end walls, only one of which, 6', is illustrated. A suitable roof structure 7 covers the housing and a partition 8 divides the enclosed space into the two separate compartments 4 and 5. This partition may be omitted, if desired, without modifying the essentials of my invention.

Suitably supported upon spaced-apart sprocket-wheels 9 and 10, mounted upon suitable shafts 11 and 12 at the upper portion of the housing structure, is an endless chain 13. This chain is suitably guided, at the lower portion of the housing structure, by sprocket-wheels 14 and 15, mounted upon shafts 16 and 17, respectively.

As may be seen by reference to Fig. 2, the chain 13 is mounted for movement adjacent to one of the end walls 6, and a second chain 18, identical with the chain 13, is mounted for movement adjacent to the opposite end wall 6'.

Mounted in any suitable manner upon the chains 13 and 18, as by a trunnion-bar 19, is a platform 20 of suitable size and shape to accommodate a vehicle which it is desired to place upon it. The platform 20 may be suspended from the bar 19 in any suitable manner, as by side supports 21 and 22, a top support 23 and suitable braces 24 (Fig. 1). In order to add rigidity to the suspended structure a spacing bar or bars 25 may be located between the uppermost ends of the suspending structure 21 and 22, etc.

Suitably mounted upon the structure 20, is a pair of roller members 26 and 27 which are rotatable upon supporting shafts 28 and 29 for engagement with guide rails 30 and 31, mounted at opposite sides of the platform. The guide rails 30 and 31 are preferably of the channel type and are suitably supported from the walls 6 and 6', respectively, by supporting members or brackets 32 and 33, respectively. As may be seen by reference to Fig. 1, these guide channels extend throughout the path of travel of the chains 13 and 18 and are so designed as to conform in shape to the path of movement of any given point on the chains 13 or 18.

At the uppermost portion of the movement of the platforms, it is necessary to provide an opening in the guide rails 30 and 31 to permit the passage of the chains 13 and 18. This is represented, in Fig. 1, at the point designated by the reference character 34 and comprises merely the spacing of the portions 35 and 36 of the guide rail 31, and the provision of flared ends 37 and 38 for these portions. As may readily be seen by an inspection of Fig. 2, the bars 19 extend between the points of passage of the guide rails 30 and 31, and the provision of the opening 34 suitable for the passage of the bar and guide rail is made necessary.

The number of platforms which may be mounted upon a single chain is, of course, dependent upon the lateral clearance required by the platforms in their passage over the sprocket-wheels 9 and 10 at the uppermost point of their travel. Ten of these platforms are shown in Fig. 1, but it is obvious that any number may be mounted by extending the structure of the housing 1 vertically or by the modification of the length of each of the platforms within the limits defined by the longest automobile which may be parked or stored in the system. The size and arrangement of the sprocket-wheels 9 and 10 may also be varied to fit varied conditions of the size of the platforms which may be used.

Each of the platforms is provided with suitable guide members 40 and 41, represented as channel members, for the guiding of the vehicle wheels and for the retaining of the vehicle in its proper position upon the platform 20. These guide members are represented as being in the form of channel irons and are provided, at one end, with a suitable fixed stop member 42 and, at the other end, with a removable stop member 43 for maintaining the automobile or vehicle in its proper position upon the platform 20.

A suitable gate 44 is secured to the upright member 22, as by hinges 45, and has, at its opposite end, a suitable latch 46 for retaining the gate in closed position. The latch 46 may be of any suitable type and preferably operates a switch 47, when in closed position, to maintain a pair of contact members 48 (Fig. 1) in closed-circuit position.

In order to provide a supporting means independent of the chains 13 and 18 when a platform is adjacent to the entrance or loading point 49 of the housing structure 1, a pair of supporting members 50 and 51 are provided. These may be of any suitable form and are shown as latching bars 52 suitably spring pressed to a platform-engaging position by means of a spring 53. In order to withdraw the latching members 52 when it is desired to move the platforms, suitable magnet coils 54 are operatively connected, as hereinafter described, to the control circuits for the operating devices.

A motive means for driving the chain and platforms is represented as a motor 55 suitably mounted upon a base 56 at the lowermost portion of the housing structure 1. The motor 55 is suitably coupled to one of the sprocket-wheels 14, as by sprocket-wheel 57 on the motor shaft 58 being connected by a chain 59 to a sprocket-wheel 60 rotatable with the sprocket-wheel 14.

The driving motor 55 is diagrammatically represented in the wiring diagram of Fig. 1 and comprises a suitable armature EM and a shunt field winding EMF.

The motor 55 may be controlled in any suitable manner and is represented as forming a part of a "variable-voltage" system of the Ward-Leonard type, comprising a driving motor M of the shunt-wound type, including an armature M' and a shunt field winding MF. The armature M' of the motor M is directly coupled to the armature G' of a suitable generator G. The generator G is of the compound-wound type comprising a series field winding GSF, a shunt field winding GF, a demagnetizing winding GAF and the armature G'. The armature G' and series field winding GSF are connected in a "loop" circuit with the armature EM of the motor 55.

The motor 55 is started and stopped by the energization and deenergization of the generator shunt field winding GF. The generator shunt field winding GF is controlled by a suitable starting relay 60, which becomes operatively responsive to the actuation of a series of push-buttons A, B, etc., corresponding to the associated platforms A', B', etc. Only two of the control buttons A and B are illustrated but it is to be noted that a button is provided, in this system, for each of the platforms in the system.

A suitable drum contact-making device 61, preferably of the floor selector type, such as is used in push-buttom elevator-control systems, is represented as being mounted upon the base 56 and connected to one of the main sprocket-wheels 15, by means of a belt or chain 62, with a pulley 63 mounted upon the shaft 17. In this manner, the contact-making device or platform selector 61 is driven in correspondence with the movements of the platforms. The mechanical design of the platform selector and the pulleys is of such character that the platform selector 61 will make a complete revolution as any given platform, for example, A, travels from the loading point 49 throughout the entire travel of the chain and back to the loading point 49. The platform selector 61 is represented as a development designated by the reference numeral 61' in the wiring diagram of Fig. 1.

The control system comprises the push-buttons A, B, etc., platform selector 61', the motor-starting relay 60, and push-button relays, for the respective push-buttons, designated by reference numerals 65 and 66 and corresponding to the push buttons A and B, respectively. The push-button relays are severally associated with suitable re-set relays, such as relays 67 and 68. A relay 69 of the time-element type, having a set of normally-closed contact members, is provided with a dash-pot 70 or other suitable timing means for the purpose of retarding the closing of the contact members of the relay 69.

The operation of the system may best be described by reference to an assumed operation:

Assuming that the platforms are all empty, a vehicle may be driven up to the entrance 49 of the storage structure 1, passing from the street 75 over a side-walk 76 to the entrance 49. As will be hereinafter described, a platform is always adjacent the opening 49.

Assuming that the platform A' is adjacent the opening 49, the driver may move his car directly upon the platform, upon which the stop members 42 and 43 may be set to hold the car in position. The attendant at the storage structure 1 will then close the gate 44, and the platform is ready to move out of the way to permit an unloaded platform to be brought adjacent the opening 49. This operation is accomplished by pressing the button corresponding to the next platform above the one just loaded.

Assuming the chains to be movable in the direction indicated by the arrows, the attendant will press the button B, thus closing a circuit to the push-button relay 66 associated with this button, which circuit extends from line contactor L1 through conductor 77, push-button B, conductor 78, coil of relay 66, conductor 79, normally closed contact members $b$ of relay 68, and conductor 81 to line conductor L2.

The relay 66 will then close its contact members $a$ and $b$, thereby completing a circuit for the starting relay 60, which circuit extends from line conductor L1 through conductor 82, contact members $a$ of relay 66, conductors 83 and 84, the coil of starting relay 60, conductor 85, the normally-closed contact members $a$ of time-element relay 69, conductor 86 and thence, in series, through each of the normally-closed gate switches 48 of each of the platforms in this system, to line conductor L2. The relay 66 also closes a self-holding circuit which extends from line conductor L1 through conductor 82, contact members $a$ of relay 66, conductor 87, the coil of relay 66, and thence to line conductor L2, as previously traced for this coil.

The starting relay 60 closes its contact members $a$ and $b$, completing a circuit supplying current to the generator shunt field winding GF, which circuit extends from line conductor L1 through conductor 90, contact members $b$ of relay 60, conductor 91, generator shunt field winding GF, conductor 92, contact members $a$, and conductors 94, 95 and 96 to line conductor L2. The motor 55 is thus started, and the platforms are all moved around in their path.

The starting relay 60 also closes its contact members $c$, completing a circuit for the latch-releasing magnets 54, which circuit extends from line conductor L1, through conductors 97, 98 and 99, coils 54 of each of the latching devices and thence, by way of conductor 100, contact members 60$c$ and conductors 101, 95 and 96, to line conductor L2. The latching members 51 and 52 are, therefore, withdrawn as the motor is energized, and the platforms may, therefore, be moved.

The platforms continue to move until the platform B' approaches closely adjacent to the entrance 49, at which time the contact segment 102 of the platform selector device 61 has been moved to the right (in the development shown) prior to engaging the brushes 103 and 104. The engagement of the brushes 103 and 104 completes a circuit which energizes the reset relay 68. This circuit for relay 68 extends from line conductor L1 through conductor 82, contact members $b$ of relay 66 conductor 106, brush 104, segment 102, brush 103, conductor 107, the coil of relay 68, and conductor 81 to line conductor L2.

The reset relay 68, being now energized, opens the previously-traced circuit for the relay 66 and closes the contact members $a$, completing a circuit for the time-element relay 69. This circuit extends from line conductor L1 through conductor 108, the coil of relay 69, conductors 109 and 110, contact members $a$ of relay 68, and conductor 81 to line conductor L2. The deenergization of the relay 66 breaks the circuit for the starting relay 60, and the motor is thus stopped. With the proper design of the platform selector and its driving mechanism, the platform B' will thus be stopped at an exact level with the opening 49.

The next automobile may be driven up the platform B' and the operation repeated until all of the platforms are loaded.

When it is desired to unload the automobiles from the platforms, the same operation of the push-buttons may be used. Assuming that the drivers of the automobiles parked on platforms A' and B' arrive to secure their cars at approximately the same time, the attendant, having preferably issued to each man, at the time of parking, a check or tag indicating the platform on which his automobile has been parked, may readily ascertain from such tag the number of the platform and may operate the button corresponding thereto. For example, in the case of the platforms A' and B', the attendant may simultaneously operate the buttons A and B. The motor 55 will be started as previously described and the platforms will continue to move until the platform A', which is the first to approach the opening 49, arrives adjacent to the opening, and at this time the motor will be stopped.

The stop in this instance is slightly different from that previously described. The energization of the relays 65 and 66 closes parallel circuits to the stopping relay 60, which must be broken at some point other than at one of those relays 65 and 66.

The contacting of the segment 112, corresponding to the platform A', completes a circuit for the reset relay 67, thus deenergizing the relay 65, and the relay 67 completes a circuit for the relay 69, as previously described with reference to relay 68.

The relay 69 operates to break the circuit for the starting relay 60, and the motor 55 is stopped when the platform A' is level with the opening 49. The dash-pot 70 on the relay 69 allows a short time interval during which the gate 44, corresponding to the platform A', may be opened and, through the agency of the switches 47 and 48, the circuit for the starting relay 60 is maintained open until this gate 44 is again closed. At this time the closing of the contact members 48, on the gate switch 47, will permit the starting relay 60 to again be energized through the contact members $a$ of the relay 66, and the motor will again be started to bring the platform B' to the opening 49. Thus, the operation of a plurality of push buttons will bring the platforms to the opening 49 in succession.

In the event of an erroneous pushing of a button, for example, should the attendant operate the buttons A and B when the platform B' is the only one desired the platform A' will be moved to the opening 49, at which time the relay 69 would be energized and the motor stopped as previously described. However, if the gate 44 is not opened at a predetermined time, for example, 5 seconds, the relay 69 will again close and the system will again be started automatically to bring the platform B' to the opening without further operation of the button B.

It is my purpose to have several of the towerlike housings 1 adjacent each other and to locate the push-buttons A, B, etc., for all of the towers in a centralized location. This feature is illustrated in Fig. 4, wherein three towers, designated as 1, 1' and 1", preferably have their adjacent walls in common, and which are provided with suitable openings 49, 49' and 49", respectively. Located in some suitable point is a control board 113, upon which are mounted a series of buttons 114, 115 and 116 representing the control buttons for towers Nos. 1, 1' and 1", respectively. In this way, a single attendant may care for a plurality of storage towers or housings, and the systems may be controlled from a central location.

In Fig. 3 is illustrated a slightly modified form of the device of Fig. 1. In this figure a suitable housing 1, has side walls 2 and 3 and a partition wall 8 defining vertical shafts or hatchways 4 and 5, all of which are substantially identical with similar parts illustrated in Fig. 1. A chain 13 and another chain (not shown) for mounting a series of platforms A, B and C, corresponding to the chains 13 and 18 and the corresponding platforms in Fig. 1. A suitable guide rail 31, corresponding to the guide rail 31 shown in Fig. 1, is illustrated for the purpose of guiding the platforms.

In this figure, however, the platforms extend with their shortest side in the direction from right to left in the drawings in such manner that the automobiles must be moved in a sidewise direction when placed upon the platforms. The purpose of this is to reduce, as much as possible, the lateral dimension of the platforms, and, in this manner, permit a greater number of platforms to be suspended from the chain 13 than is possible with the arrangement of Fig. 1. As hereinbefore stated, the spacing of the platforms on the chain is determined by the lateral dimension of the platforms because of the necessary clearance which must be provided as the platforms swing over the sprockets 11 and 12 at the top of the tower or housing structure 1.

In order to provide for the necessary sidewise motion of the automobiles in loading them upon the platforms, a truck or car 120, mounted upon wheels 121 and provided with suitable guide rails 122 corresponding to the guide rails 41 (Fig. 2), is mounted upon a track 123, which has portions suitably disposed on each of the platforms A, B and C and on the base 124 of the entrance point 125.

The entrance point in this modification is illustrated as an opening 49', corresponding to the opening 49 of Fig. 1. Surrounding the opening 49' is a suitable shelter 126 formed of side walls 127, the base 124 and a roofing structure 128. Suitably inclined driveways (not shown) may be provided for elevating the automobiles to the proper level for movement onto the truck 120.

In the operation of this form of my system the automobiles are driven upon the truck 120, and the truck 120 is then moved upon the platform A. By manipulation of the control system, as in Fig. 1, the platform A is moved upwardly, and the platform B is brought adjacent to the opening 49'. It is my intention that there be a suitable truck for each of the platforms A, B, etc., and that these trucks shall remain upon the platforms except during the time of loading and unloading.

It is thus seen that I have provided an automobile parking and storage system wherein a large number of automobiles may be parked upon a comparatively small ground area, and wherein each automobile so parked is readily accessible at all times.

It is to be understood that the apparatus described is merely illustrative, many variations in the structure being possible without modification of the essentials of the invention disclosed. I, therefore, do not desire to be limited to any of the details shown or described except as defined in the appended claims.

I claim as my invention:

1. In a storage system, a housing having an entrance, a plurality of storage elements, means for mounting said storage elements for simultaneous movement in an endless path within said housing, means for moving said elements, means for selecting a plurality of storage elements and registering calls therefor, and means for stopping said moving means as each selected storage element arrives at said entrance.

2. In a storage system, a housing having an entrance, a plurality of storage elements, means for mounting said elements for simultaneous movement in an endless path within said housing past said entrance, means for moving said elements, means for selecting a plurality of storage elements and registering calls therefor, and means including means movable in correspondence with the movements of said elements for stopping said moving means as each selected element arrives at said entrance.

3. In a storage device, a housing having an entrance, a plurality of storage elements, means for mounting said elements for simultaneous movement over a continuous path past said entrance, motive means for moving said elements, and control means for said motive means, including means for selecting a plurality of storage elements and registering calls therefor, for actuating said motive means to cause selected storage elements to approach said entrance and to stop thereat successively in the natural order in which they reach said entrance.

4. In a storage device, a housing having an entrance, a plurality of storage elements, means for mounting said element for simultaneous movement over a continuous path past said entrance, motive means for moving said elements, individual control means for each of said elements simultaneously operable to select a plurality of elements and register calls therefor, and means actuated by operation of any of said control means for actuating said motive means to cause the selected storage elements to approach said entrance and to stop thereat successively in the natural order in which they reach said entrance.

5. In a storage system, a housing having an entrance, a plurality of storage elements, means for mounting said storage elements for simultaneous movement within said housing, means for moving said elements, means for selecting a plurality of storage elements and registering calls therefor, means for stopping said moving means only when a selected storage element is adjacent said entrance, means independent of said mounting means for supporting said elements at said entrance, and means operable by actuation of said moving means to move said elements for rendering said supporting means ineffective.

6. In a storage system, a plurality of storage elements, means for mounting said elements for simultaneous movement over a continuous path past a loading point, a controlling device for each of said elements, electromagnetic means operably responsive to the operation of any of said control devices for starting said motive means, electromagnetic means for stopping said motive means, and means operable in correspondence with movements of said elements for effecting the operation of said stopping means to stop said motive means when an element corresponding to the actuated control means arrives at said loading point.

7. In a storage system, a plurality of storage elements, means for mounting said elements for simultaneous movement over a continuous path past a loading point, motive means for moving said elements, a control device individual to each of said elements, electromagnetic means operably responsive to the operation of any of said control devices for starting said motive means, electromagnetic means for maintaining said starting device active when operated, and means including means movable in accordance with the movement of said elements, for releasing said maintaining means when the corresponding element arrives at the loading point.

8. In a storage system, a plurality of storage elements, means for mounting said elements for simultaneous movement over a continuous path past a loading point, electrical motive means for moving said elements, control means therefor including a switch individual to each of said elements, a self-holding relay individual to each of said elements and operable responsive to the actuation of the associated switch for actuating said motive means, means individual to each of said elements for deenergizing the self-holding relay for that element, and means for actuating said deenergizing means when the corresponding element arrives at said loading point.

9. In a storage system, a plurality of storage elements, means for mounting said storage elements for simultaneous movement over a continuous path past a loading point, motive means for said element, controlling means for said motive means including a switch individual to each of said element, means connecting all of said switches in parallel relation to each other and in series relation with said control means, timed relay means, means connecting said timed relay means in series relation with said controlling means, means operated responsive to the actuation of one or more of said switches for actuating said controlling means, and means operable in accordance with movements of said elements for actuating said timed relay means to stop said moving means when the element corresponding to an actuated switch arrives at said loading point.

10. In a storage system comprising a supporting structure having a loading station, a plurality of storage elements movable simultaneously in an endless path within said structure past said loading station, and motive means for moving said receptacles, the combination therewith of a control system for said motive means comprising a control means for each of said storage elements for establishing a call for that storage element, said control means being simultaneously and successively operable to establish a plurality of calls at one time, means responsive to the calls established to effect a movement of said motive means to move the storage elements to the loading station, and means for stopping the storage elements, for which calls have been established, at the loading station in successive order determined by the physical position thereof, regardless of the order in which the calls are established.

11. In a storage system comprising a supporting structure having a loading station, a plurality of storage elements movable in an endless path within said structure successively past said station, and motive means for moving said elements, the combination therewith of a control system for said motive means comprising control means for each element operable to establish a call for the corresponding element, said control means being operable simultaneously and successively to establish a plurality of calls at one time, means responsive to the control means operated to effect a movement of said motive means to move said elements to said loading station, and means for successively stopping the receptacles, for which control means have been operated, in natural order, determined by the physical position thereof, at said loading station for a predetermined length of time.

12. In a storage system comprising a supporting structure having a loading station, a plurality of storage elements movable in an endless path within said structure successively past said station, and motive means for moving said elements, the combination therewith of a control system for said motive means comprising control means for each element operable to establish a call for the corresponding element, said control means being operable simultaneously and successively to establish a plurality of calls at one time, means responsive to the control means operated to effect a movement of said motive means to move said elements to said loading station, means for stopping said motive means when an element for which a control means has been operated reaches a loading station and for effecting the movement of said motive means after the expiration of a predetermined interval of time to successively move other elements for which corresponding control means have been operated to the loading station, a closure for each element, and means operable thereby for rendering said stopping and starting means controlling said motive means ineffective to cause movement of the storage elements unless all of said closures are closed.

13. In a storage system, including a housing having an entrance, the combination of a plurality of storage elements, means for mounting said storage elements for simultaneous movement over a continuous path past the entrance, motive means for moving said elements, control means for said motive means, including means for selecting a plurality of storage elements and registering calls therefor, means for stopping said motive means only when a selected storage element is adjacent said entrance, power means for said motive means, supporting means independent of said mounting means for supporting said elements at said entrance, and means operable responsive to the application of power to said motive means for withdrawing said supporting means.

14. In a storage system including a housing having an entrance, the combination of a plurality of storage elements, means for mounting said storage elements for simultaneous movement over a continuous path past the entrance, electrical motive means for moving said elements, control means for said motive means, including means for selecting a plurality of storage elements and registering calls therefor, means for stopping said motive means only when a selected storage element is adjacent said entrance, means independent of said mounting means for supporting said elements at said entrance, and electromagnetic means operable responsive to the energization of said motive means for withdrawing said supporting means.

15. In a storage system, a plurality of storage elements, means for mounting said elements for simultaneous movement over a continuous path past a loading station, motive means for moving said elements, a plurality of control devices one for each of said elements, for selecting the corresponding elements and registering a plurality of calls therefor, means operably responsive to the operation of any one of said control devices for effecting the actuation of said motive means, switch means for stopping and starting said motive means, and means movable in accordance with the movement of the said storage elements for effecting the operation of said stopping switch to immediately stop said motive means when any element corresponding to a control device operated arrives at the loading station, said switch being responsive to the expiration of a predetermined time to start said motive means when other calls remain registered.

16. In a storage system, a plurality of storage elements, means for mounting said storage elements for simultaneous movement over a continuous path past a loading station, a closure, motive means for moving said elements in said path, control means for effecting the starting and stopping of said motive means, means individual to each of said elements for collectively registering calls for a plurality of storage elements and for effecting the energization of said control means, electromagnetically operated means for de-energizing said control means, means movable in accordance with the movement of said elements for effecting the actuation of said deenergizing means when any element for which a call has been registered arrives at said loading station, and timed means for rendering said deenergizing means ineffective to prevent energization of said control means upon the lapse of a predetermined time after the stopping of said motive means and before the opening of said closure when other registered calls exist.

In testimony whereof I have hereunto subscribed my name this 11th day of July, 1927.

WALTER S. RUGG.